Figure 1:
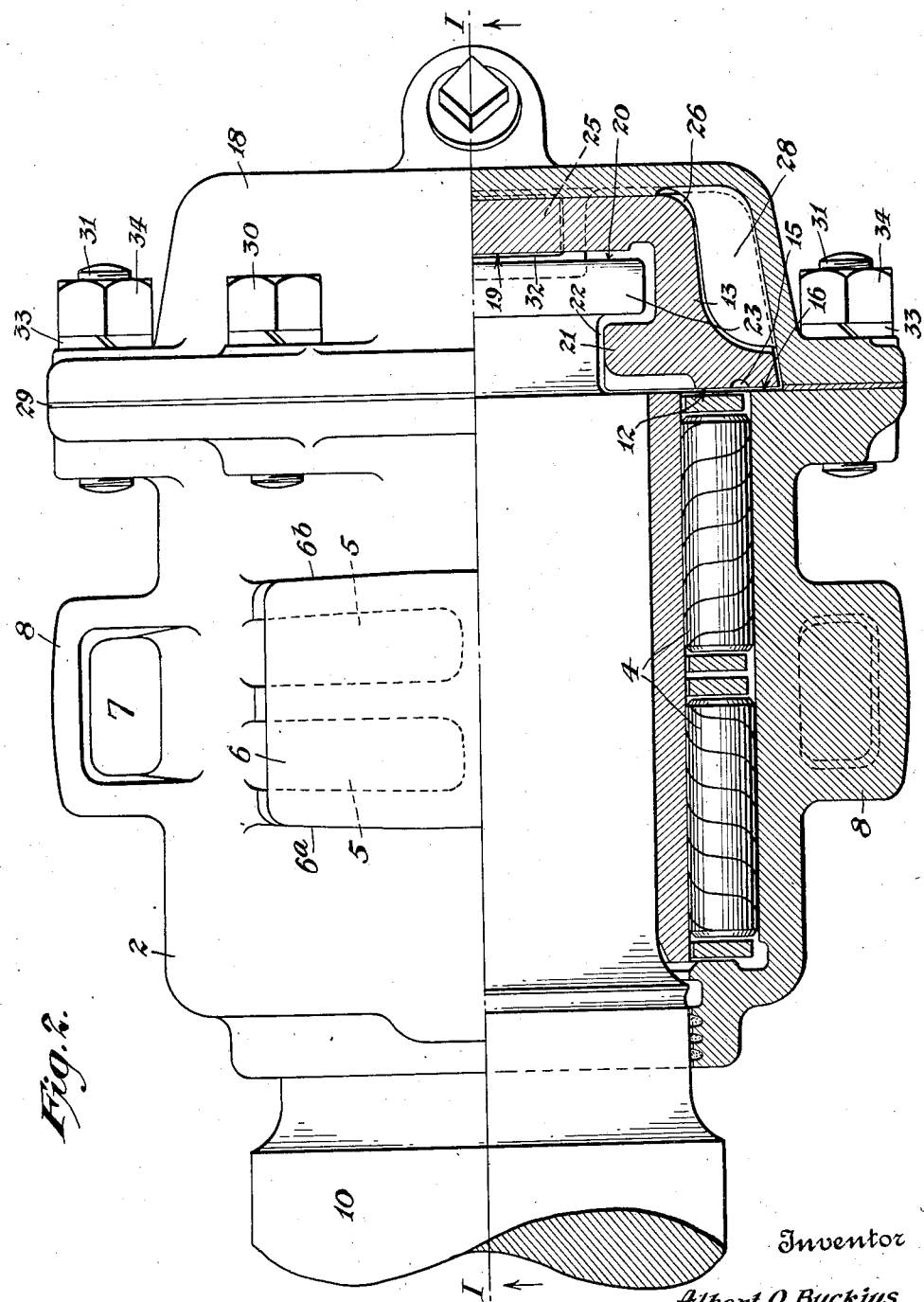

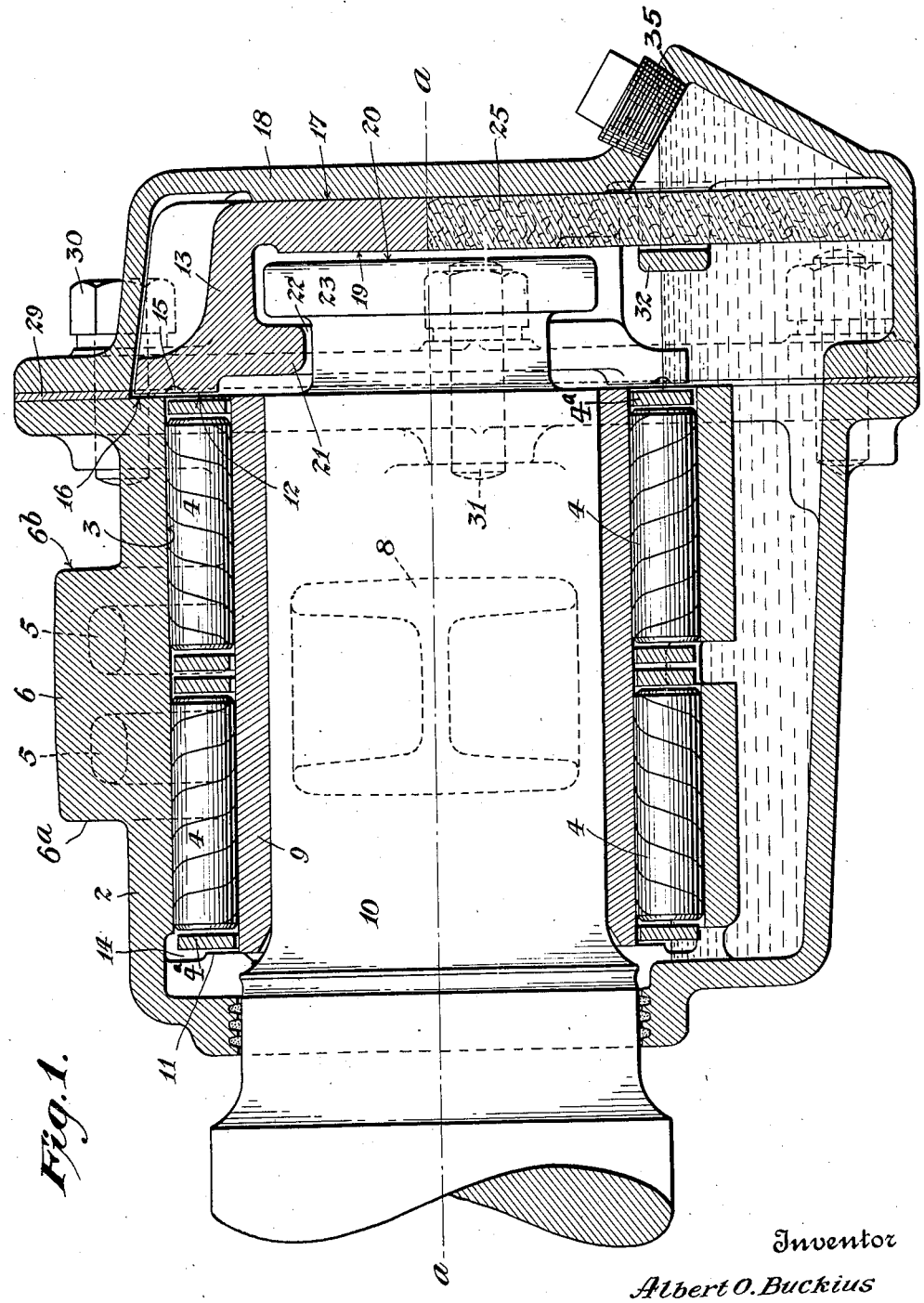

June 21, 1932.  A. O. BUCKIUS  1,864,337
ROLLER BEARING JOURNAL BOX
Filed Jan. 21, 1928  3 Sheets-Sheet 2

Inventor
Albert O. Buckius
By his Attorney
Clarence Kerr

June 21, 1932.   A. O. BUCKIUS   1,864,337
ROLLER BEARING JOURNAL BOX
Filed Jan. 21, 1928   3 Sheets-Sheet 3
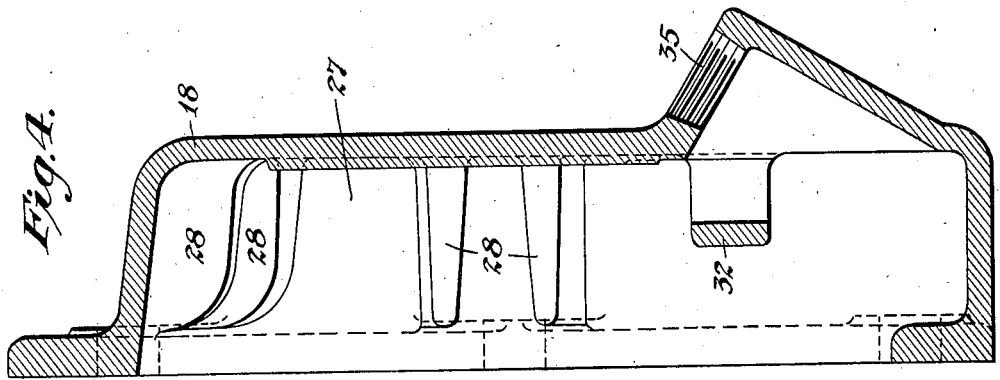
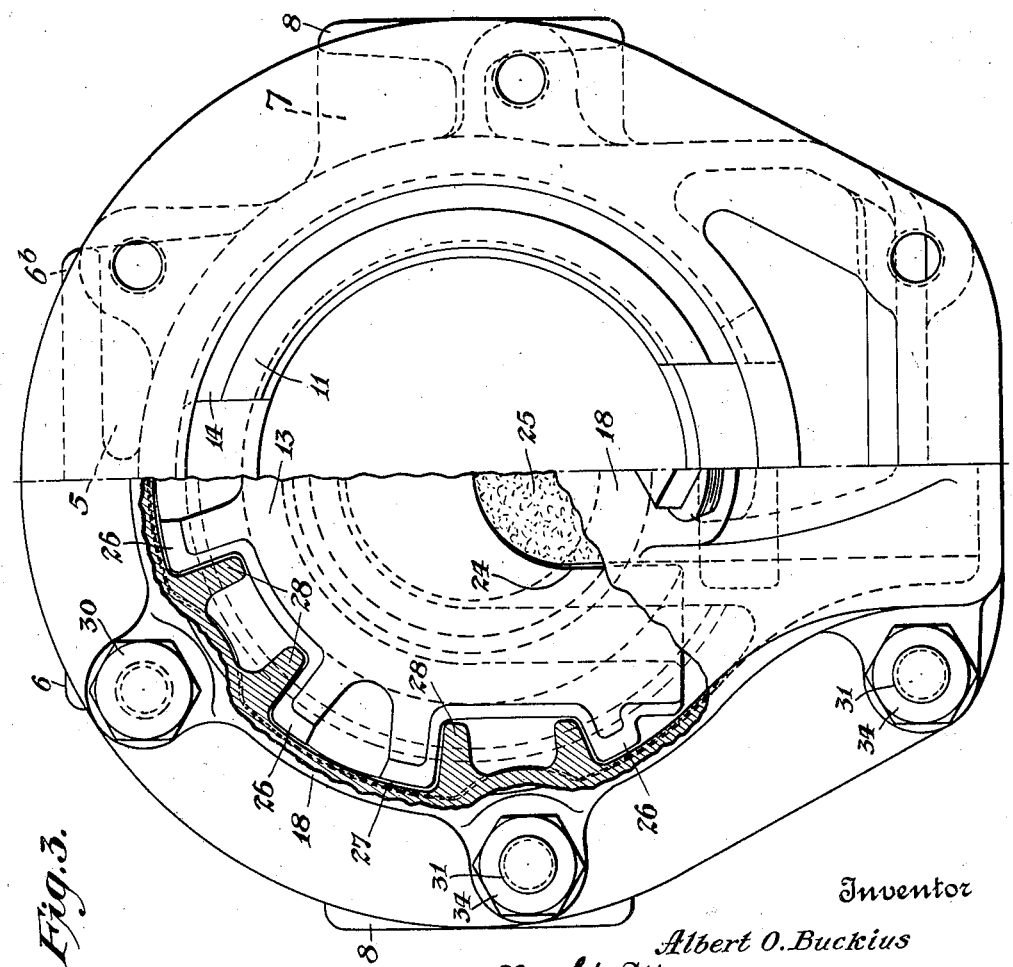
Inventor
Albert O. Buckius
By his Attorney
Clarence D. Kerr Patented June 21, 1932

1,864,337

UNITED STATES PATENT OFFICE

ALBERT O. BUCKIUS, OF CLEVELAND, OHIO, ASSIGNOR TO NATIONAL MALLEABLE AND STEEL CASTINGS COMPANY, OF CLEVELAND, OHIO, A CORPORATION OF OHIO

ROLLER BEARING JOURNAL BOX

Application filed January 21, 1928. Serial No. 248,343.

My invention relates to roller bearing journal boxes, and comprises a box provided with means for taking both inward and outward axle end thrusts against the box parts. My invention is particularly adapted for use in connection with the present flexible type of freight car trucks, where a substantial amount of flexibility is provided between the two side frames of the truck because of its ability to take up end thrusts in either direction.

My improved box provides a thrust block which also acts as a retainer for the roller bearings and occupies a position outside the mouth of the housing so that it may readily be applied and removed without disturbing the position of the housing. My invention also enables the outer race to be dispensed with, provides a novel means for securing the lubricating wick, and comprises as well various features which I shall hereinafter describe and claim.

In the accompanying drawings, Fig. 1 is a vertical section on line I—I of Fig. 2, of a journal box embodying my invention; Fig. 2 is a plan, partly in section, thereof; Fig. 3 is an end elevation thereof, partly in section; and Fig. 4 is a vertical section of the cover.

Referring more specifically to the drawings, the journal box has a housing 2 which has cylindrical surfaces 3 which provide unbroken outer races for the roller bearings 4, of which I have shown two sets. To permit the formation of these continuous surfaces 3 the depressions 5 in the top lug 6 are preferably formed by exterior cores, but no cores are necessary for the depressions 7 in the side lugs 8, as the housing 2 may be molded on the parting line a—a, which renders coring unnecessary.

The inner race 9 preferably has a press fit with the axle 10. The roller bearings 4 are held in position between the races 3 and 9 by the shoulder 11 on the housing 2, which bears against the inner ends of the roller bearing retainer 4ª, and by the arc-shaped retaining surface 12 of the thrust block 13 which bears against the outer face of the bearing retainers 4ª. The shoulder 11 and surface 12 are recessed at 14 and 15, respectively, to prevent the rings 4ª from wearing shoulders thereon.

The thrust block 13, which preferably is a bronze die casting, lies wholly outside the mouth of the housing 2, and its retaining surface 12, which holds the roller bearings 4 in place, is interrupted only to the extent required to pass over the journal, and extends outwardly beyond the recess 15 to engage the annular end surface or lip 16 about the mouth of the housing 2. The thrust block bears at its outer face 17 against the inner face of the cover 18 and at its inner face 19 against the end face 20 of the axle, by which the inward thrusts of the box relative to the axle are taken up. The block 13 has also a semi-circular projection 21 intended to seat in the recess 22 behind the annular shoulder 23 on the end of the axle and to bear on such shoulder and thereby take up endwise outward thrusts of the box relative to the axle. The projection 21 extends down past the horizontal middle plane of the axle as far as is practical without interfering with the ability to remove the block 13 from the axle. The purpose of extending the projection is to give the greatest possible bearing area of the block upon the axle. The block 13 also has a central recess or slot 24 in its lower portion for reception of the upper end of the wick 25.

To prevent rotation of the thrust block 13 with the axle 10 and relative to the cover, the block has a plurality of radially extending shoulders 26 which fit into corresponding recesses 27 between the lugs 28 on the inner face of the cover 18.

The cover 18 is secured against the surface 16 of the housing, or, if desired, against a gasket or shim 29 upon such surface, by means of bolts 30 and studs 31, the latter of which make it easy to apply the cover 18 to the housing 2, bolts 30 being used at the top of the box, as the studs 31 would interfere with the removal or assembly of the thrust block 13. The wick 25 is supported in the loop or staple 32.

In assembling my improved box, the roller bearings 4 and retainers 4ª are slid into the open side of the housing 2. The housing 2 with the rollers 4 and retainers 4ᵃ therein is next slid over the journal 10, which has previously been brought to size, the inner race 9 pressed on and the journal end machined to the form shown, with the groove 22 therein, and shoulder 23 thereon. The thrust block 13 is dropped over the end of the journal with its projection 21 in engagement in the groove 22. If shims or gaskets 29 are to be used, these may then be applied around the mouth of the housing. A wick 25 is inserted in the staple 32 inside the cover 18, and the cover 18 is slipped over the thrust block 13 and upon the stud bolts 31, which have previously been tapped into the housing. Lock washers 33, nuts 34 and top bolts 30 are then applied and the box filled with oil to the level indicated in Fig. 1, and the hole 35 is stoppered with a plug. The journal assembly is then ready for application to a car truck.

My improved journal box has the advantage of having few parts and of being of very great strength. Its simplicity of construction has reduced the size and weight and has made the surfaces to be ground few and easy of access, and has greatly increased the facility with which the parts may be assembled. The contruction of the thrust block so that it will also serve as a bearing retainer enables the wearing surface 12 and the thrust surfaces 19 and 21 to be made of the same material and combines in one piece the surfaces in the box which are subject to appreciable wear and thereby simplifies the replacement problem.

It will also be seen that the meeting surfaces 16 of the housing 2 and cover 18 are of a character to be brought to bearing by the usual grinding operation, and that no special machining is required.

With the improved box shown herein an end thrust to the right tends to pull the box off the axle 10, for the reason that the force is transmitted from the side frame (not shown) through the inner face 6ᵃ of the top lug 6 of the box, and from the housing through its surface 16 to the surface 12 of the retaining flange of the thrust block, and is resisted by the engagement of the projection 21 against the shoulder 23 on the axle 10. End thrust in the opposite direction (to the left in Fig. 1) is conveyed from the side frame (not shown) to the housing through the outer face 6ᵇ of the top lug 6 and is transmitted to the cover 18 through the bolts 30 and studs 31, from the cover 18 to the thrust block 13, and from the lubricated face 19 of the thrust block to the end face 20 of the journal. It is thus obvious that boxes made in accordance with this invention adequately take care of end thrusts in either direction, and that it is impossible for such boxes to slip off the axle, regardless of the type of truck or the amount of flexibility existing between the side frames of such truck.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. In a journal box having roller bearings arranged between the journal and the housing, a separable cover for said housing, a thrust block having an upward projection forming a roller bearing retainer and having bearings on the journal adapted to take up end thrusts in either direction, the thrust block lying wholly outside the plane of the mouth of the housing to permit ready application and removal thereof when the cover is removed.

2. In a journal box having roller bearings arranged between the journal and the housing, a cover, a unitary thrust block interposed between the cover and the housing and having a portion extending over the end of the journal, said block lying wholly within the cover and outside of the mouth of the housing, the cover having a retainer thereon for the support of a lubricating wick wholly outside of said housing in a recess in the thrust block.

3. In a journal box having roller bearings arranged between the journal and the housing, a closure for said box and a thrust block seated between said closure and a shoulder on said box and having a part forming a retainer for said roller bearings; a portion of said thrust block extending over the end face of said journal, said portion being adapted to transmit end thrusts to the part of the closure opposite the end of the journal, said thrust block and journal cooperating to limit endwise movement of said journal in either direction.

4. In a journal box having roller bearings arranged between the journal and the housing, a closure for said box and a combined thrust block and bearing retainer seated between said closure and a shoulder on said box and overlying the end of said rollers and having a portion extending between the end face of said journal and the closure, said portion being adapted to transmit end thrusts to the part of the closure opposite the end of the journal, said thrust block and journal cooperating to limit endwise movement of said journal in either direction.

5. In a roller bearing journal box having an open front end for inserting a roller bearing assembly, the face of the box terminating adjacent the outer end of the assembly, a removable cover enclosing the mouth of the box, a thrust block seated between the cover and the face of the box and lying wholly without the mouth of the box, said thrust block serving also as a roller bearing retainer.

6. In a journal box having a roller assembly arranged between the journal and the housing, a separable cover for said housing, a thrust block positioned between said cover and housing, the outer face of said thrust block engaging the inner face of said cover, a projection on said thrust block extending upwardly into axial alinement with said rollers, the inner face of said projection lying substantially in the plane of the mouth of said housing, said roller assembly extending substantially to the plane of the mouth of the housing and being retained by said projection.

In testimony whereof, I have signed my name to this specification this 19th day of January, 1928.

ALBERT O. BUCKIUS.